Patented June 1, 1943

2,320,799

UNITED STATES PATENT OFFICE 2,320,799

CATALYSTS AND PREPARATION THEREOF

Robert F. Ruthruff, Chicago, Ill.

No Drawing. Application February 7, 1940, Serial No. 317,770

10 Claims. (Cl. 196—52)

The present invention relates to catalytic materials and methods for the preparation thereof. More particularly, the present invention relates to catalytic materials useful in accelerating the conversion of hydrocarbons of relatively low utility and value into hydrocarbons of higher utility and value and to methods for the preparation thereof.

The employment of various silica-alumina complexes, both natural and synthetic, for accelerating the conversion of hydrocarbons of relatively low utility and value into hydrocarbons of higher utility and value is becoming well known in the art. For example, the employment of activated clays of the bentonite or montmorilonite type as catalysts for accelerating the conversion of hydrocarbons boiling above the usual gasoline range into hydrocarbons boiling within the usual gasoline range has already been exploited on the commercial scale. Such catalysts are usually prepared by activating clays of the aforementioned types by treating them with dilute mineral acids at elevated temperatures. By this procedure, such materials as alkali metal oxides, alkaline earth oxides and iron oxides are more or less completely removed together with more or less aluminum oxide. As this activating treatment is continued, the activity of the resulting product as a catalyst for the previously mentioned process reaches a maximum and then declines with further treatment. Activated clays showing maximum catalytic effect for the previously mentioned conversion process usually have a silica to alumina weight ratio of about 4 to 1, more or less. For further information on these materials reference may be had to United States Patent 2,078,945, issued May 4, 1937 to E. Houdry. These activated clays, while very cheap, are not especially active and furthermore suffer a gradual decline in catalytic activity on repeated regeneration. It has been suggested that clays of the aforementioned types be employed in the previously mentioned conversion process without any activating treatment by acid or otherwise but such materials are almost invariably so inactive as to merit no consideration. It has also been found that satisfactory catalysts for the previously mentioned conversion process may be prepared by drastically overtreating clays of the aforementioned types so that the resulting products exhibit little if any catalytic activity and then impregnating said overtreated materials with aluminum oxide in the proper quantity.

The use of synthetic silica-alumina complexes as catalysts for accelerating the conversion of hydrocarbons of relatively low value and utility into hydrocarbons of higher value and utility has also been suggested. For example, the product formed by the hydrolytic adsorption of alumina on silica gel has been suggested and has been commercially used as a catalyst for accelerating the conversion of gaseous olefines higher than ethylene into liquid hydrocarbons boiling within the usual gasoline range. For further information on this subject, reference may be had to United States Patent 2,068,016, issued January 19, 1937, to F. H. Gayer. Similarly, a product formed by the hydrolytic adsorption of alumina on silica gel has been suggested and has been commercially used as a catalyst for accelerating the conversion of hydrocarbons boiling above the usual gasoline range into hydrocarbons boiling within the usual gasoline range. For further information on this subject reference may be had to my copending application, Serial Number 305,473, filed November 21, 1939. Also, the product formed by the union of silicic acid or a salt thereof with aluminum hydroxide or an aluminum salt has been suggested as a catalyst for accelerating the conversion of hydrocarbons boiling above the usual gasoline range into hydrocarbons boiling within the usual gasoline range. For further information on this subject, reference may be had to my copending application, Serial Number 305,472, filed November 21, 1939. This silica-alumina complex, prepared by the union of silicic acid or a salt thereof with aluminum hydroxide or a salt of aluminum may also be employed to advantage as a catalyst to accelerate the conversion of olefines higher than ethylene into liquid hydrocarbons boiling within the usual gasoline range. All of these synthetic silica-alumina complexes, while exhibiting satisfactory activity and satisfactory stability on repeated regeneration, are quite expensive to prepare.

Briefly, the present invention relates to improved catalysts for the acceleration of various conversion reactions, said catalysts comprising a substrate of silica prepared from a natural siliceous material and further characterized by the fact that the substrate is obtained in the form of flakes, sheets or plates of little thickness and large area and hence exhibits a high surface to volume ratio.

One of the objects of my invention is the provision of catalysts of novel physical form for accelerating chemical reactions.

One other object of my invention is the provision of catalysts for the conversion of hydrocarbons of relatively low utility and value into hydrocarbons of higher utility and value, said catalysts being readily and economically prepared synthetically from a natural siliceous material, said catalysts being further characterized by the fact that they are obtained in the form of flakes, sheets or plates of little thickness and large area.

An additional object of my invention is the provision of catalysts for the conversion of hydrocarbons boiling above the usual gasoline range into hydrocarbons boiling within the usual gasoline range, said catalysts being readily and economically prepared synthetically from a natural siliceous material, said catalysts being further characterized by the fact that they are obtained in the form of flakes, sheets or plates of little thickness and large area.

A further object of my invention is the provision of catalysts for the conversion of olefines higher than ethylene into hydrocarbons boiling within the usual gasoline range, said catalysts being readily and economically prepared synthetically from a natural siliceous material, said catalysts being further characterized by the fact that they are obtained in the form of sheets, plates or flakes of little thickness and large area.

Various other objects and features of my invention will become apparent as the description thereof proceeds.

In the preparation of my improved catalysts the mineral most commonly known as vermiculite is employed as the natural source of the silica substrate. This mineral, which is also known under several varietal names such as jefferisite, is generally formed as the result of alteration of biotite, phlogopite or other varieties of mica. The vermiculites have a rather indefinite composition but numerous analyses indicate that the chemical constitution can be approximated by the formula:

$22SiO_2 \cdot 22MgO \cdot 5Al_2O_3 \cdot 1Fe_2O_4 \cdot 40H_2O$

Vermiculite occurs in the form of glistening black mica-like aggregates. It is believed that this material is built up of layers having unit cells of the approximate composition:

$(MgFe)_3(AlSi)_4O_{10} \cdot (OH)_2 \cdot 4H_2O$ each pair of sheets being separated by four molecules of water. On heating the mineral a most remarkable phenomenon occurs to which the term exfoliation has been applied. On exfoliation, vermiculite expands enormously, the volume increase being as great as sixteen fold so that a final product is produced having a bulk density of six pounds per cubic foot or less. Simultaneously, the color of the mineral changes, the exfoliated material being a beautiful glistening golden brown. Expansion during exfoliation is largely unidirectional. The flat mica-like plates of the original mineral separate greatly as exfoliation proceeds while the area of the original mineral particle remained substantially unchanged. Exfoliation can best be compared with the expansion of an accordion. By applying pressure in the appropriate direction, the exfoliated particles can be compressed nearly to the original dimensions prior to exfoliation.

In United States Patent 1,898,774, issued February 21, 1933, to R. G. Guthrie and O. J. Wilbor, a process is described for producing practically pure silica in the form of very thin sheets, plates or flakes and exhibiting high adsorptive and absorptive properties by digesting vermiculite, either in the unprocessed state or after exfoliation, with strong mineral acids. I have discovered that excellent catalysts, especially catalysts for accelerating the conversion of hydrocarbons of relatively low value and utility into hydrocarbons of higher value and utility, can be prepared from such very thin sheets, flakes or plates of silica by suitably activating them with alumina, magnesia or similar promoters.

The catalysts prepared pursuant to my invention differ radically from natural occurring or acid treated clays of the bentonite or montmorillonite type and from the synthetic silica-alumina complexes which have heretofore been proposed for use in the aforementioned catalytic conversion processes. The catalysts of the prior art exist in a particulate or approximately sphere-like form having a low surface to volume ratio. Certain of the synthetic silica-alumina complexes which has a substrate of silica gel have, it is true, a large specific surface due to the presence of myriads of microscopic pores in the individual silica gel substrate particles. However, the advantages that should theoretically follow from such large specific surfaces are not realized in practice. This I attribute to two factors (1) slowness of diffusion of reactants or products and (2) sealing of the microscopic pores by carbonaceous residues. In catalytic conversion processes it is axiomatic that for reaction to occur the reactant must reach the catalytic surface. In, for example, the conversion of hydrocarbons boiling above the usual gasoline range into hydrocarbons boiling within the usual gasoline range using a synthetic silica-alumina complex having a silica gel substrate as catalyst, and having a particulate or approximately spherical form, because of the high molecular weight of the reactants diffusion into the pores of the substrate is extremely slow so that, in effect, the active portion of the catalyst corresponds approximately to the gross geometrical surface thereof. If on the other hand, an attempt is made to convert a gaseous olefine higher than ethylene to a liquid hydrocarbon boiling within the gasoline range using a similar catalyst, the reactants, being of low molecular weight diffuse with comparative ease into the microscopic pores but the products, especially those traces of products boiling above the usual gasoline range, being of much higher molecular weight, leave the pores with slowness so that again, in effect, the active portion of the catalyst corresponds approximately to the gross geometrical surface thereof. Additionally, in all these hydrocarbon conversion processes, more or less carbonaceous residue of low hydrogen to carbon ratio is formed as byproduct. This carbonaceous residue effectively seals the microscopic pores of the catalysts of the prior art and prevents diffusion of reactants into or of products from the interior of the silica gel substrate.

It is seen that if the catalysts of the prior art having a particulate or approximately spherical shape could be rolled out into sheets, plates or flakes of great area and very little thickness many advantages would follow. I have discovered that highly active catalysts having this preferred physical form may be made by using as the silica substrate, the plates, sheets or flakes of silica obtained from vermiculite by the process previously indicated. For the better understanding of my invention several illustrative examples will now be given describing suitable methods for the preparation of said improved catalysts.

*Example 1*

One hundred parts by weight of exfoliated vermiculite are covered with 660 parts by weight of water containing 330 parts by weight of concentrated sulfuric acid. The resulting pasty mass is digested at the boiling point or a little below to purify the mineral. As digestion continues, the exfoliated aggregates gradually disintegrate into individual plates, the color of the solid changes from a golden brown to white and the reaction mixture becomes much thinner. As digestion continues still further the reaction mass begins to thicken again. This is attributed to the hydration of the plates, flakes or sheets of silica. After digesting for a period of from three to five hours, more or less, the reaction mixture consists of a thick suspension of glistening white silica plates, flakes or sheets together with a few darker colored plates representing gangue. The digestion liquor is removed and the remaining solid is washed by decantation, filtration, or otherwise. If desired, the solid may be washed one to three times with dilute acid, for example, 5 to 10% sulfuric acid followed by three to five washings with water. After the last washing the resulting filter cake is analyzed to determine the solids and water content and is then added to an aluminum sulfate solution so that the resulting mixture contains in the neighborhood of 275 parts by weight of solids, 2,500 parts by weight of water and 55.5 parts by weight of aluminum sulfate octadecahydrate. The whole is then heated to 80 to 90° C. more or less and maintained at this temperature for about two hours to activate the sheets, plates, or flakes of silica through hydrolytic adsorption of alumina following which the activating solution is separated from the solids which are in turn washed three to six times, more or less, with water and then dried to form the finished catalyst.

Obviously, if desired, the aluminum sulfate solution used in preparing the activating solution may be obtained from the digestion liquor by known methods, for example, by the method described in U. S. Patent 1,898,830, issued February 21, 1933, to R. G. Guthrie and O. J. Wilbor. During purification of vermiculite it is evident that a concentration of aluminum sulfate is gradually built up in the digesting medium. It might be expected that activation should occur during purification and no separate activation step be required. Actually, a slight amount of activation does occur during purification but a catalyst of satisfactory activity does not result. This is attributed to the high acidity of the activating solution which inhibits hydrolysis of aluminum sulfate and hence prevents any appreciable hydrolytic adsorption of alumina. If desired, at the end of the purification process the pH of the liquor may be brought up to about 4, following which digestion is continued about two more hours in order to activate the solids following which these are washed and dried to form the finished catalyst.

*Example 2*

One hundred parts by weight of unexfoliated vermiculite are covered with 330 parts by weight of 33% sulfuric acid and the reaction mixture is digested at the boiling point or slightly below for a period of six hours, more or less. At the start of the digestion process the vermiculite swells very appreciably although the volume increase is not nearly as great as is observed during exfoliation. Also, during the early stages of the digestion process the reaction proceeds with considerable vigor even without the application of heat. The purified flakes, sheets or plates of silica are then washed as previously described (Example 1) and the final wet cake containing the purified and washed solids is added to a strong (30%) aqueous solution of aluminum nitrate nonahydrate. After standing for several hours or preferably over night, the solids are separated from the liquid, are dried slowly and are then calcined at a temperature of about 400 to 500° C. to form the final catalyst.

*Example 3*

The procedure is similar to that of Example 2 except that a strong solution of magnesium nitrate is used in place of a strong solution of aluminum nitrate.

It is obvious that the silica-alumina or silica-magnesia catalysts prepared in accord with Examples 2 and 3 may be made in ratios extending over a considerable range by varying the concentration of the appropriate salt solutions in which the purified and washed flakes, sheets or plates of silica are soaked. Catalysts of different silica-metal oxide ratios show somewhat differing activities when employed and while a certain ratio may result in optimum catalytic properties in one conversion process, another ratio may be preferable for use in a different conversion process. In general, best results are obtained with silica-metal oxide complexes containing 20% or less metal oxide, preferably from 5 to 15% metal oxide.

While the purification of vermiculite by digesting with dilute sulfuric acid at or near the boiling point at atmopsheric pressure is a perfectly satisfactory operation, if desired, the purification may be accomplished more rapidly by operating under higher temperature at correspondingly elevated pressure. Purification at elevated temperatures and pressures is especially effective when the massive mineral is being processed.

While the purification of vermiculite by treatment with sulfuric acid has been described in the examples, it is obvious that any strong acid, except hydrofluoric acid, may be used for the purpose, for example, nitric acid, hydrochloric acid or a mixture of the two (aqua regia).

It is seen that the preparation of catalysts in accord with the above examples involves two broad steps, (1) purification of the mineral, and (2), activation of the resulting flakes, plates or sheets of silica by adsorption of alumina or incorporation with alumina or magnesia. It is to be understood that while exfoliated material is employed in Example 1 and the massive mineral is processed in Examples 2 and 3, if desired, massive mineral may be treated as described in Example 1 and exfoliated material as described in Examples 2 and 3. In the purification of massive vermiculite, the opportunities for attack by the acid are comparatively limited as compared with those presented by exfoliated material. However the speed of purification of exfoliated vermiculite is not in proportion to the enhanced surface presented to the acid in comparison with the massive mineral. This is attributed to the fixing of alumina, magnesia, iron oxide, etcetera in the structure of the silica due to the elevated temperatures used in exfoliation. Accordingly, the massive mineral, while presenting comparatively little area to acid attack, contains impurities in a very labile state and hence purification is frailly rapid. On the other hand, while the impurities in exfoliated vermiculite are rather firmly bound to the silica, because of the large surface presented, purification is again fairly rapid. In general, somewhat more rapid purification and somewhat more active catalysts are obtained by starting with exfoliated material.

The final catalysts obtained by the procedures outlined above are in the form of plates, flakes or sheets of extreme thinness. In general, this physical form is not suitable for most catalytic processes. As has been explained in considerable detail in my copending application, Serial Number 313,898, filed January 15, 1940, catalytic processes may be divided into three main groups with respect to the way of contacting catalyst and charge. These are:

1. Processes in which the catalyst is disposed in a stationary bed.
2. Processes in which the catalyst is moved continuously or intermittently through the reaction zone.
3. Processes in which the catalyst is suspended in the reactant and the suspension is then passed through the reaction zone.

For processes 1 and 2 catalysts in the form of flakes, plates or sheets are not particularly suitable, catalysts in the form of discrete particles of appreciable size are preferable. It is seen that the products formed in accord with the present invention are not particularly for use in these two processes. For process 3, small, easily suspended catalyst particles are desirable and it is seen that the catalyst formed in accord with the present invention is of ideal physical form for this purpose.

To render the catalysts formed in accord with the present invention suitable for use in the first two processes named these plates, flakes or sheets may be mechanically formed into aggregates constituting discrete particles by pelleting in a pill machine or by extrusion with or without a suitable binding material. One eminently suitable method for forming the small thin plates, flakes or sheets into aggregates constituting discrete particles comprises adding from 5 to 25%, preferably from 10 to 15% of bentonite clay to the finished but undried or only partially dried catalyst. After thorough mixing the whole is passed through an extrusion machine provided with a cutter to produce cylinders of any desired size which are then dried.

While the above examples relate to catalysts comprising plates, sheets or flakes of silica in combination with alumina or magnesia, it is to be understood that these two metal oxides may be replaced by other oxides, by elements or compounds. Among such other catalyst combinations may be mentioned plates, sheets, or flakes of silica in combination with metallic silver. Such a combination is useful as a catalyst for promoting the oxidation of organic compounds. Another combination useful for similar reactions comprises plates, sheets, or flakes of silica in combination with vanadium pentoxide formed as described in Example 2, substituting ammonium vanadate for aluminum nitrate. A catalyst combination useful in the dehydrogenation or desulfurizing of organic compounds comprises plates, sheets, or flakes of silica in combination with chromium oxide prepared in accord with Example 2, ammonium dichromate, chromium nitrate or chromium trioxide being substituted for aluminum nitrate. Another combination useful in accelerating various organic oxidations comprises flakes, sheets, or plates of silica in combination with manganese oxide made in accord with Example 2, manganese nitrate being substituted for aluminum nitrate. Plates, flakes or sheets of silica in combination with metallic platinum comprise a catalyst useful in promoting the union of sulfur dioxide and oxygen to form sulfur trioxide. An excellent catalyst for the polymerization of gaseous olefines higher than ethylene to liquid hydrocarbons boiling within the usual gasoline boiling range may be prepared by mixing one part by weight of plates, flakes or sheets of silica with 2 to 2.5 parts by weight of orthophosphoric acid and calcining the whole at about 300° C. until the mass solidifies.

To further illustrate the applications of the catalysts of this invention, the following illustrative examples are given:

*Example 4*

A catalyst prepared in accord with Example 1 is thoroughly mixed with 10% untreated bentonite (the commercial variety known as Volclay bentonite being employed) and the mixture is extruded, the resulting spaghetti being cut so as to form cylinders which after drying are about ¼ inch in diameter and ¼ inch high. The resulting pellets are disposed in a suitable reactor and contacted therein with a refinery butane cut containing 15% isobutene and 30% normal butenes which is passed therethrough at a temperature of approximately 200° C. and a pressure of 1500 pounds per square inch. Under these conditions the conversion of isobutene to liquid polymers is practically quantitative and more or less of the normal butenes react similarly depending upon the contact time. If the gas mixture is passed at a rate of 10 cubic feet (standard conditions) per hour per pound of catalyst, reaction of the normal butenes is practically quantitative, while at a rate of 40 cubic feet per pound of catalyst about half of the normal butenes react.

Similar results are obtained by substituting the catalyst of Example 2 for that employed in the instant example.

*Example 5*

Catalyst pellets prepared as described in Example 4 are disposed in a suitable low pressure reactor and are contacted therein with the vapors of hydrocarbons boiling above the usual gasoline range by passing therethrough the vapors obtained from a Mid-Continent gas oil having an A. S. T. M. initial of 482° F. and an A. S. T. M. endpoint of 748° F. and an A P. I. gravity of 35.4°. The gas oil charge is heated to a temperature in the range 825°–950° F., is vaporized, and passed over the catalyst at a rather low pressure, 50 pounds per square inch. As much as 60% of the charge is converted to liquid hydrocarbons boiling within the usual gasoline range, the exact amount of conversion obtained in various experiments depending upon the operating temperature and contact time employed. The contact time may vary from that obtained by passing the charge to the reactor at a rate of 0.5 volume of charge (measured as liquid) per hour per volume of catalyst space to 2.0 volumes per hour per volume, more or less.

Similar results are obtained when using catalysts prepared in accord with Examples 2 and 3.

*Example 6*

Catalyst pellets prepared in accord with Example 4 are disposed in a suitable low pressure reactor. Heavy naphtha from Mid-Continent crude, having an approximate boiling range of from 250 to 400° F. is vaporized and passed through the catalyst at a rate of from 1.0 to 4.0 volumes of charge (measured as liquid) per hour per volume of catalyst space. The portion of the product formed that falls within the usual light naphtha boiling range exhibits a motor knock rating of from 78 to 80. The yield of this product depends upon the operating temperature and the time of contact. Operating temperatures may be within the range 825 to 950° F. Particularly good results are obtained at a flow rate of 1.0 (as previously defined) and an operating temperature of 850° F.

Similar results are obtained when using catalysts prepared in accord with Examples 2 and 3.

While specific details for the preparation of the improved catalysts of the instant invention have been described by means of numerous examples, it is to be understood that these are illustrative only and are in no way to be construed as limiting the scope of the instant invention except insofar as these specific details are included in the appended claims.

I claim:

1. In the production of catalysts adapted to the conversion of hydrocarbons of relatively low value and utility into hydrocarbons of higher value and utility, the step including uniting substantially flat highly adsorptive plates, flakes or sheets of silica obtained from vermiculite by treating said mineral with acid, with alumina.

2. In the production of catalysts adapted to the conversion of hydrocarbons of relatively low value and utility into hydrocarbons of higher value and utility, the step including uniting substantially flat, highly adsorptive plates, sheets or flakes of silica obtained from vermiculite by treating said mineral with sulfuric acid, with alumina.

3. A catalyst adapted to the conversion of hydrocarbons of relatively low value and utility into hydrocarbons of higher value and utility comprising a substrate of substantially flat, highly adsorptive plates, sheets or flakes of silica united with alumina.

4. A process of converting hydrocarbons of relatively low value and utility into hydrocarbons of higher value and utility comprising contacting said hydrocarbons of relatively low value and utility at conversion temperature with a catalyst comprising a substrate of substantially flat, highly adsorptive plates, flakes or sheets of silica obtained from vermiculite by treating said mineral with acid, united with alumina.

5. A process of converting hydrocarbons of relatively low value and utility into hydrocarbons of higher value and utility comprising contacting said hydrocarbons of relatively low value and utility at conversion temperature with a catalyst comprising a substrate of substantially flat, highly adsorptive plates, flakes or sheets of silica obtained from vermiculite by treating said mineral with sulfuric acid, united with alumina.

6. In the production of catalysts adapted to the conversion of hydrocarbons boiling above the usual gasoline range into hydrycarbons boiling within the usual gasoline range, the step including uniting substantially flat, highly adsorptive plates, sheets or flakes of silica obtained from vermiculite by treating said mineral with acid, with alumina.

7. In the production of catalysts adapted to the conversion of hydrocarbons boiling above the usual gasoline range into hydrocarbons boiling within the usual gasoline range, the step including uniting substantially flat, highly adsorptive plates, sheets or flakes of silica obtained from vermiculite by treating said mineral with sulfuric acid, with alumina.

8. A catalyst adapted to the conversion of hydrocarbons boiling above the usual gasoline range into hydrocarbons boiling within the uusal gasoline range comprising a substrate of substantially flat, highly adsorptive plates, flakes or sheets of silica united with alumina.

9. A process of converting hydrocarbons boiling above the usual gasoline range into hydrocarbons boiling within the usual gasoline range comprising contacting said hydrocarbons boiling above the usual gasoline range at conversion tempertaure with a catalyst comprising a substrate of substantially flat, highly adsorptive plates, flakes or sheets of silica obtained from vermiculite by treating said mineral with acid, united with alumina.

10. A process for converting hydrocarbons boiling above the usual gasoline range into hydrocarbons boiling within the usual gasoline range comprising contacting said hydrocarbons boiling above the usual gasoline range at conversion temperature with a catalyst comprising a substrate of substantially flat, highly adsorptive plates, flakes or sheets of silica obtained from vermiculite by treating said mineral with sulfuric acid, united with alumina.

ROBERT F. RUTHRUFF.